United States Patent [19]
Holloway

[11] Patent Number: 5,604,802
[45] Date of Patent: Feb. 18, 1997

[54] TRANSACTION PROCESSING SYSTEM

[75] Inventor: Christopher J. Holloway, Woking, United Kingdom

[73] Assignee: International Business Machines Corporation, Armonk, N.Y.

[21] Appl. No.: 276,138

[22] Filed: Jul. 18, 1994

[30]     Foreign Application Priority Data

Oct. 29, 1993 [GB] United Kingdom ............. 9322360

[51] Int. Cl.$^6$ ....................................... H04K 1/00
[52] U.S. Cl. ............................... 380/24; 380/49
[58] Field of Search .......................... 380/23, 24, 25, 380/3, 4, 49

[56]            References Cited

U.S. PATENT DOCUMENTS

| | | | |
|---|---|---|---|
| 4,995,081 | 2/1991 | Leighton et al. | 380/23 |
| 5,027,401 | 6/1991 | Soltesz | 380/54 |
| 5,091,975 | 2/1992 | Berger et al. | 382/56 |

FOREIGN PATENT DOCUMENTS

| | | |
|---|---|---|
| 0334616 | 3/1989 | European Pat. Off. . |
| 8908899 | 3/1989 | WIPO . |
| 911027 | 1/1990 | WIPO . |

Primary Examiner—David C. Cain
Attorney, Agent, or Firm—John D. Flynn

[57]            ABSTRACT

A transaction processing system comprises at least one transaction terminal (10, 11, 12) having means to receive characteristic data from a user, which characteristic data is required to generate a characteristic image associated with the user, such as an image of the user's signature, from data stored in a data processing system (14); and logic for generating a transaction message by combining transaction data with the characteristic data in such a way that the transaction data is required to recover the characteristic data from the message. The data processing system (14) comprises means to store the user data, to receive and store the message, to recover the characteristic data from the message using the transaction data, and to reconstruct the characteristic image from the user data using the characteristic data to establish that the transaction was valid by associating the characteristic image with the transaction data.

21 Claims, 12 Drawing Sheets

TRANSACTION PROCESSING SYSTEM

FIELD OF INVENTION

This invention relates to apparatus and methods in transaction processing systems and, more particularly, to apparatus and methods for the secure authorization of transactions in transaction processing systems.

DESCRIPTION OF PRIOR ART

Examples of transaction processing systems include electronic point of sale (EPOS) systems allowing customers to pay for goods by means of credit cards or the like. Such a system includes one or more transaction terminals, at which details of a transaction and of a customer's card are entered, connected via a suitable data communications network to a data processing system storing, for instance, the customers' account details to effect a transaction in the customer's account.

The fraudulent use of such systems is a serious problem which in 1991 resulted in losses of 160 million pounds in the United Kingdom alone. Much effort is being invested in studying ways of addressing these huge losses.

Currently, transactions are usually authorized by recording the customer's signature on paper. This is because the signing of a name by an individual is a dynamic action which occurs in a remarkably repeatable fashion.

However, this traditional approach has a number of attendant problems. For example, it represents a tremendous burden to the merchant, who wants to get rid of paper, and certainly avoid the obligation of having to go back in his records in case of query to find a particular sales voucher with a signature on it.

The usage of other biometrics, such as the use of fingerprint or voice recognition, which can be verified using suitable apparatus is being considered as a way of recording the fact that a customer has authorized a transaction. However, in some countries the matter is complicated by the legal need to capture the signature as evidence of the transaction.

It is therefore desirable to use electronic copies of signatures as a means of allowing a customer to authorize a transaction.

However, any means of transferring signatures in electronic form, whether or not encrypted, yields them vulnerable unless a mechanism is provided for preventing an electronic signature from being associated with transactions other than the original that was authorized.

Furthermore, if the signature associated with a transaction needs to be captured, electronically transmitted and stored in such a way that an image of the signature can be reproduced as desired, then data communications and storage become a significant overhead.

SUMMARY OF THE INVENTION

This invention aims to improve security in transaction processing systems by solving these problems. This is achieved through a new approach to associating a users authority, manifesting itself in a printable characteristic image, particularly, but not exclusively, a signature image, with a transaction authorized by the user.

Accordingly, a first aspect of the invention enables a transaction processing system to be provided comprising a data processing system and at least one transaction terminal for use at a remote location by a user, the transaction terminal comprising means to receive characteristic data from the user, which characteristic data is required to reconstruct a characteristic image associated with the user from user data stored in the data processing system; logic for generating a transaction message by combining data relating to a transaction with the characteristic data in such a way that the transaction data is required to recover the characteristic data from the transaction message; and means connectable to a data communications network for transmitting the transaction message to the data processing system, and the data processing system comprising: means to store the user data; means to receive from the network and store the transaction message; logic for recovering the characteristic data from the stored transaction message using the transaction data; and logic for reconstructing the characteristic image from the user data using the characteristic data for use in establishing that the transaction was valid by associating the characteristic image with the transaction data.

A transaction makes use of a piece of characteristic data which removes the need to capture or transmit image data with the transaction. This characteristic data is cryptographically bound to a particular transaction and so cannot be transferred or associated with another transaction. The characteristic data provides the recipient of the transaction with the ability and authority to associate a centrally held copy of the original image to the transaction data.

Thus, no image capture device is required at the transaction terminal and the overhead of transferring image data with the transaction is avoided. The fact that the transaction data is required to recover the characteristic data from the transaction message means that the characteristic data is inextricably linked to the transaction and cannot be associated with transactions other than the one intended.

Preferably, the transaction terminal comprises means to establish that the user is authorized to effect the transaction in order that the merchant may satisfy himself that the customer is bona fide. Thus, user verification can proceed on the basis of a Personal Identification Number (PIN) entered by the user at the transaction terminal, biometric or other method chosen and checked at the transaction terminal.

The transaction terminal can comprise a smart card supplied by the user and a smart card reader, the smart card comprising means to store the characteristic data and logic for combining the characteristic data with the transaction data for use in generating the transaction message. Preferably, the smart card comprises means for storing a user-specific encryption key and logic for encrypting the characteristic data using the user-specific encryption key. In this event, the data processing system also needs to use the user specific key to recover the characteristic data from the transaction message. This has security advantages because, without knowledge of the key, the characteristic data cannot be extracted from the smart card or the message decrypted if intercepted.

In one embodiment the user data comprises a random number combined with a digital representation of the signature and the characteristic data is generated from the user data using a hashing algorithm. This ensures that neither the characteristic data nor a clear copy of the signature can be used to generate a copy of the user data.

If desired, signature capture can also continue on paper as today, but it is only possible to reproduce the copy of the centrally held signature in association with a valid and authorized transaction.

Advantageously, the data processing system comprises a first data processing facility for use by a verifier which receives and stores the transaction message and effects the transaction using the transaction data; and a second data processing facility for use by an arbiter which, if necessary, can recover the characteristic data from the stored transaction message using the transaction data and reconstruct the characteristic image from the characteristic data to establish that the transaction was valid by associating the characteristic image with the transaction data.

In this embodiment, an authority called an "arbiter", can be appointed, who would be independent of the verifier, to be involved in "proving" the transaction by reconstructing the signature image in the event of a dispute regarding the validity of a claimed transaction.

In addition, the "verifier" can use the characteristic data to verify the validity of a transaction by storing an encrypted form of the user data encrypted using the characteristic data. On receiving the message the characteristic data can be recovered by the verifier from the stored transaction message using the transaction data, the encrypted user data decrypted using the recovered characteristic data, the characteristic data generated from the decrypted user data and compared with the recovered characteristic data to establish the validity of the transaction.

The invention also provides a transaction terminal adapted for use in the above described transaction processing, a smart card adapted for use in the transaction terminal, and data processing systems for use by the verifier and arbiter.

Also provided is apparatus for enrolling users of the transaction processing system, the apparatus comprising: means to generate and store a digital representation of the characteristic image for each user; and logic for generating the user data and the characteristic data from the digital representation of the characteristic image. In one embodiment, the apparatus comprises logic for encrypting the user data using the characteristic data and for creating the necessary encryption keys.

DESCRIPTION OF THE DRAWING

Embodiments of the invention will now be described, by way of example only, with reference to the accompanying drawings, in which.

DESCRIPTION OF THE PREFERRED EMBODIMENTS

Figure 8:
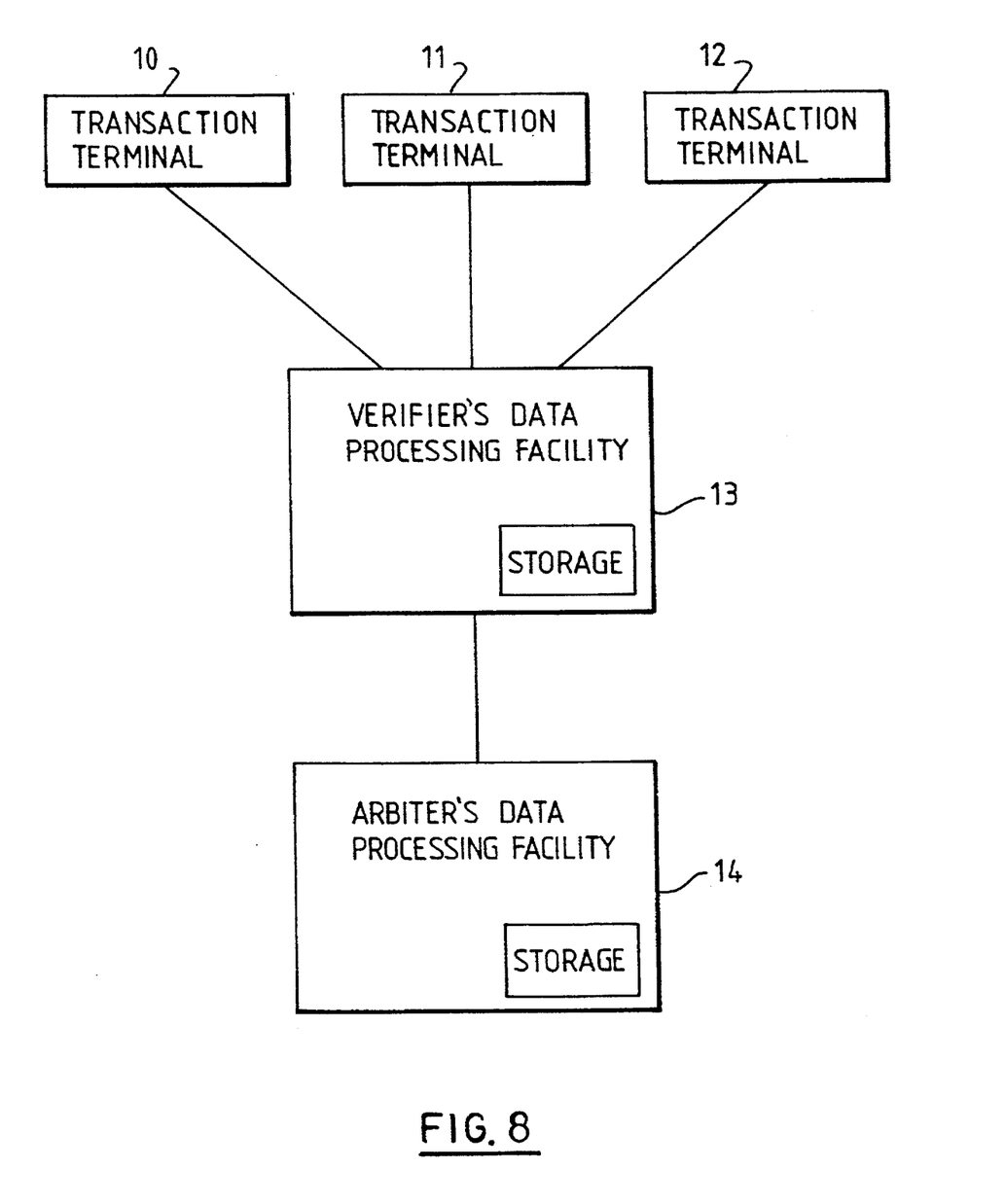
FIG. 8 shows an example of transaction processing apparatus according to an embodiment of the invention.

A transaction processing system according to a simple embodiment of the invention takes the form shown in FIG. 8. A user provides details of a transaction at a transaction terminal 10, 11, 12, which could be, for example, a Point of Sale terminal provided in a shop to allow customers to initiate transfer of funds for the purchase of goods. Transaction data is transmitted to a data processing facility 13 storing users' details, which an authority called a verifier, a bank in this example, may use to validate the transaction. An arbiter may be used to prove the validity of a transaction in the event of a dispute, and in this case the transaction processing system would include a data processing facility 14 for the arbiter's use.

Broadly, the method of operation has four steps: enrolling, transacting, verifying or validating, and proving.

During enrollment, a copy of the signature is captured and stored securely in encrypted form by the verifier for future use. Data required to release the centrally stored signature is stored securely on a card held by the user which is equipped with an integrated circuit chip containing a microprocessor and data storage facilities. Such cards are well understood in the art and have become known as 'smart cards'. The user held smart card also stores suitable program code and an encryption key which it shares with the verifier, and also with the arbiter if this option is taken.

The user uses his smart card to authorize a particular transaction at the transaction terminal. The terminal formulates the transaction data, and the microprocessor on the smart card appends to this data a seal. The seal combines cryptographically the data authorizing release of the centrally stored signature with transaction data, and authenticates the message containing both the transaction data and the seal. The encryption makes use of the encryption key provided both to the smart card and to the verifier.

The verifier receives the transaction message and recovers the authority to use the stored signature. This authority is then used to establish that the signature data forming part of the seal, which is bound to the transaction, corresponds to the stored signature. Only if the correspondence is proven will the transaction be allowed to proceed. The verifier stores the original transaction message as evidence of the transaction in case any query should arise.

The step referred to as "proving" is invoked in the case of a dispute regarding the validity of a transaction. The original transaction message is processed using the shared encryption key and stored signature. The correspondence is demonstrated again, but this time in addition a clear copy of the stored signature is generated for printing together with the transaction data. The stored signature is constructed in such a way that the clear signature cannot be used to create an alternative stored signature which might be associated with another smart card user or transaction.

If it is decided to use an independent arbiter to prove the validity of a transaction in the event of a dispute, the enciphered signature is lodged with the arbitration authority enciphered under a key that allows the arbiter, but not the verifier, to print the clear signature. Thus only the arbiter would be able to perform the proving step. In the absence of an arbiter, the verifier would be able to perform this step.

Figure 1:
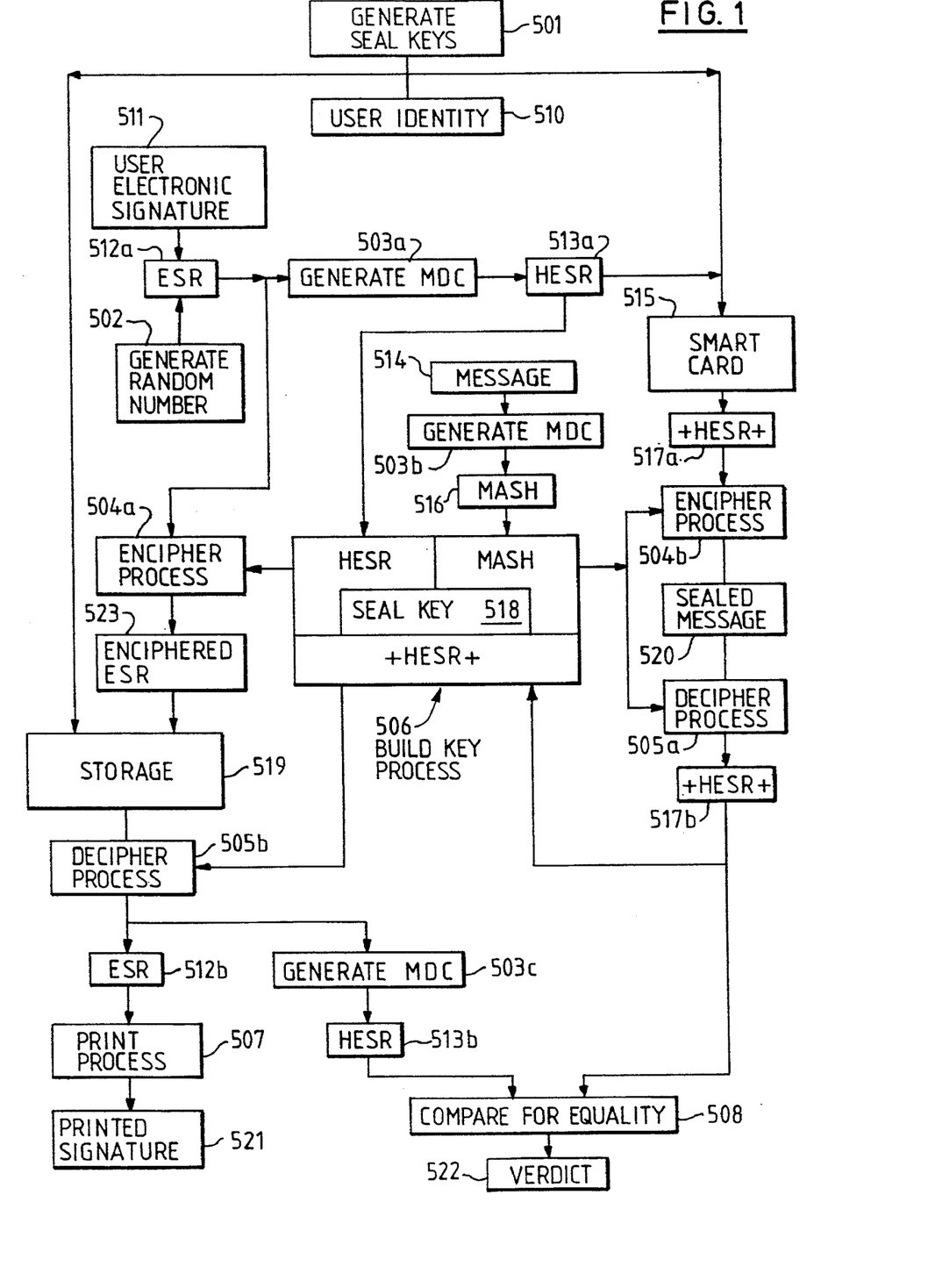
FIG. 1 is a schematic diagram of the process of the preferred embodiment of the invention in its entirety.

FIG. 1 is a schematic diagram showing these steps. This diagram is reproduced in part in four further figures, FIGS. 2 to 5, each covering one aspect of the process as described in further detail below.

Encryption algorithms allowing sensitive data to be protected, for example during electronic transmission, are widely known in the art and embodied in many systems. One such system is IBM's Transaction Security System, a set of hardware security products including a smart card and supporting the "Data Encryption Algorithm" (DEA). The DEA is a widely known algorithm, described for example in the book "Cryptography: A New Dimension in Computer Data Security" by Carl H. Meyer and Stephen M. Matyas, John Wiley & Sons 1982. The DEA was adopted by the US National Security Agency and National Bureau of Standards in 1977 as a U.S. federal standard.

Enrolling

Figure 2:
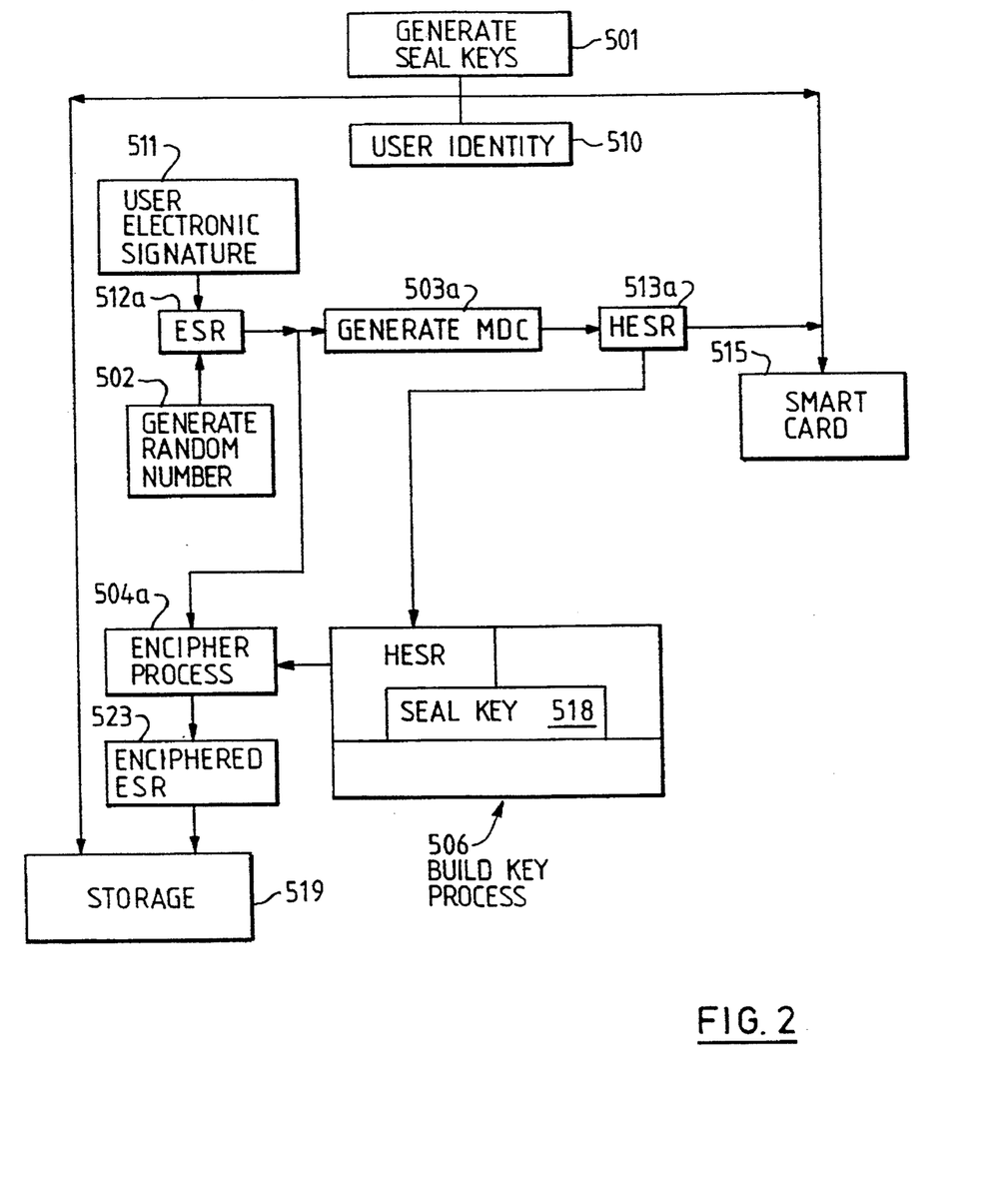
FIG. 2 is the portion of FIG. 1 which relates to the enrollment process.

As shown in FIG. 1, and FIG. 2, an encryption key called a "seal key" 501 is created and stored both in the verifier's storage 519 and on a smart card 515. Where the arbiter option is taken, a copy of the same key is provided to the arbiter who may use it for obtaining the clear signature to print. The seal key is specific to each user and is stored together with data on the user's identity 510 which will allow the appropriate seal key to be retrieved from the verifier's or arbiter's storage when required.

In IBM's Transaction Security System the usage of encryption keys may be controlled by associating with each key a Control Vector which defines its permitted usages, and this definition is enforced within the security hardware device itself. Such a Control Vector mechanism, or similar, is used to enforce the different usages of the two or three manifestations of this key. In the description which follows the seal key is referred to as a Sealing Key when used by the smart card, as a Seal Verification Key when used by the verifier and as a Seal Proving Key when used for proving by the arbiter, or in the absence of an arbiter by the verifier. Each of the types of seal processing key is represented in the diagrams by the seal key 518, irrespective of its individual function.

The user receives the smart card 515 and authenticates himself to the verifier authority using whatever means of personal authentication is appropriate, such as a Passport, driving license etc. The user enrolls by providing a means of electronic authentication which can be performed at the transaction terminal by the smart card itself or the smart card in combination with the transaction terminal. This might be a PIN, password, signature, finger print, facial image, retina pattern etc. The reference pattern for this authentication would be stored on the smart card and would be used, in a conventional manner, to authorize the smart card to process a transaction as described below.

In addition, the user also registers a copy of his handwritten signature which is captured in the form of a reproducible image 511. The image capture and printing technology is not described here but is conventional and will be well understood by the person skilled in the art. The electronic form of the signature image is a binary string of indefinite length which is padded with binary zeros (white space) to the nearest eight byte boundary point. It may also have associated with it control information describing how to reconstruct the signature from the electronic image, and it may have been compressed. This construct will be referred to as the "electronic signature" 511.

The electronic signature is preceded with a generated random number 502 (RNA) to form an "electronic signature record" or ESR 512a. Note that where reference figures are followed by a suffix eg. 512a, 512b these denote occurrences at different points in the diagram of the same data value or same process. The RNA is an arbitrary binary string of at least eight bytes, and preferably 8 or 16 bytes, since 8 bytes is a sufficient minimum for cryptographic strength, and working on 8 byte boundaries avoids the need for further padding. This use of the random number RNA prevents any copy of the clear electronic signature, or a copy of the handwritten signature, from being used to create a replica signature block to be wrongly associated with any other already issued smart card.

The whole ESR 512a is reduced to a relatively short length using a "hashing" algorithm, such as the algorithm MDC2 implemented in the IBM Transaction Security System. A detailed description of the MDC2 algorithm is given in an article by S. M. Matyas, "Key handling with control vectors", IBM Systems Journal 30, No. 2, 151–174 (1991), and available from IBM as Reprint Order No. G321-5428. The MDC2 algorithm is a "modification detection code" based on DEA encryptions. A modification detection code is a nonsecret cryptographic variable of fixed, relatively short length calculated from a message with a public (nonsecret) one-way function. A cryptographic one-way function has the property that, given the output, cryptographic key, and algorithm, it is impractical to derive the input value, or to derive another input resulting in the same output. The MDC2 algorithm processes data in multiples of 8 bytes, with a 16 byte minimum and results in a 16 byte output.

The MDC2 algorithm is therefore suitable for reducing the ESR 512a, which in this embodiment is of indefinite length, and results in a hashed ESR (HESR 513a), an arbitrary binary string of 16 bytes which is specific to the electronic signature and associated random number RNA.

The HESR, or a function of the HESR is then used to encipher 504a the value of the ESR 512a. This enciphered ESR 523 is stored in the verifier's storage 519, together with any necessary data, eg. a user or smart card number, to allow it to be retrieved and associated with the correct user. The HESR 513a, or the function thereof, is stored in the memory of the smart card for use when transacting, but is not stored elsewhere in the system.

In this embodiment, the encipher process 504a selected is a "triple encipherment" process, but other enciphering methods known in the art could be used. Triple encipherment is a process defined in IBM's Common Cryptographic Architecture/1 (CCA/1), which is implemented in the IBM Transaction Security System previously mentioned. The 16 byte HESR 513a is first combined with the 16 byte seal key 518 via the Build Key Process 506. The Build Key Process could be, for example, a simple exclusive OR operation, or if desired an encryption. The resulting 16 byte key is then used as a "double length DEA key" to triple encipher the ESR 512a. The triple encipherment entails splitting the 16 byte key into 8 byte left and right halves, DEA enciphering with the left, DEA deciphering with the right, and finally DEA enciphering with the left half.

The use of the HESR 513a to encipher the ESR 512a for storage by the verifier prevents the verifier from deciphering the stored and enciphered signature 523 without the HESR 513a information, which is obtainable only from the smart card 515. In other words, the verifier is not able to obtain the deciphered signature without the authorization of the smart card 515 user.

Transacting

Figure 3:
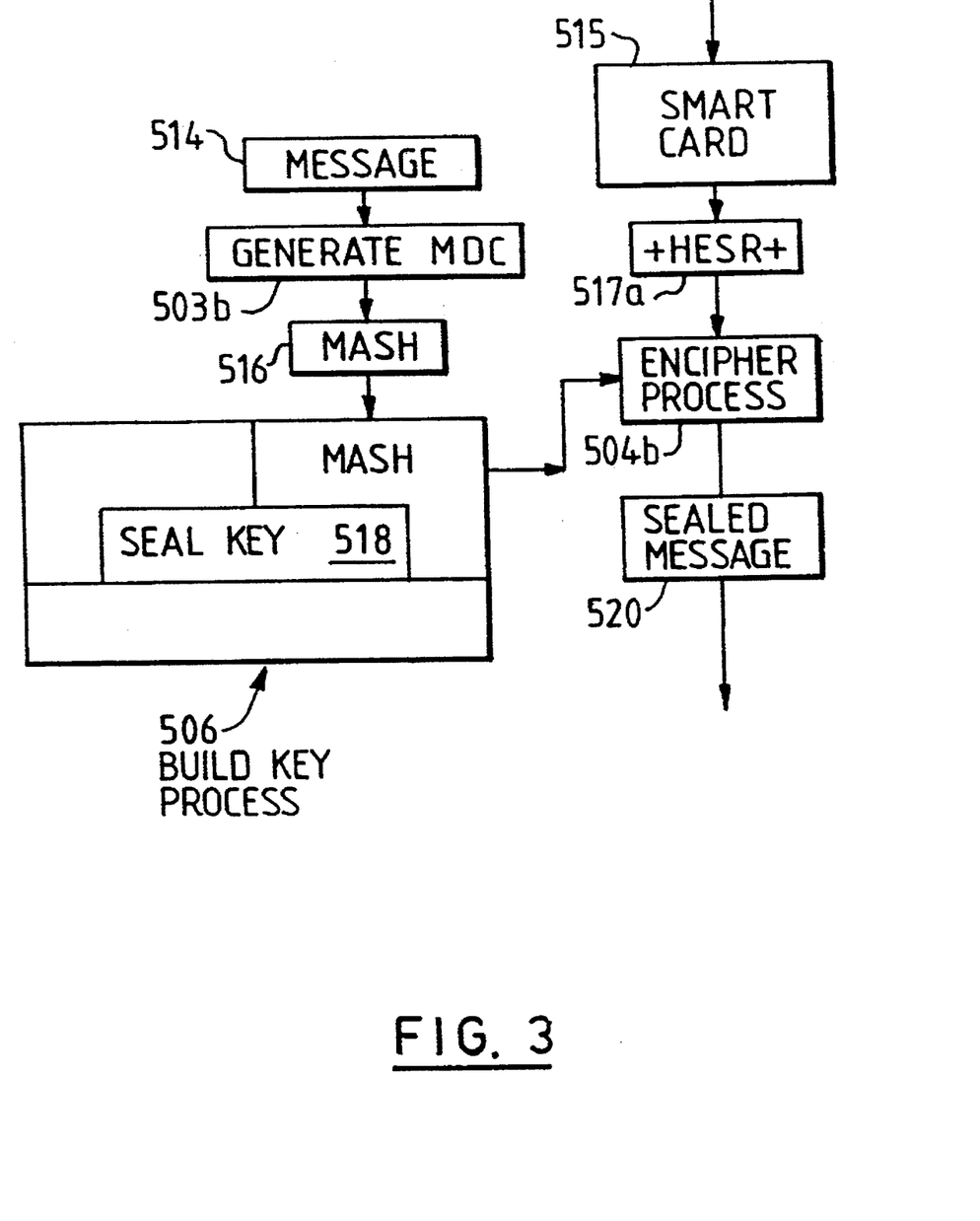
FIG. 3 is the portion of FIG. 1 which relates to the transaction process.

The transaction portion of the process is shown in FIG. 3. A transaction is established and agreed upon at a transaction terminal. This manifests itself as a formatted and structured bit string or character string coded in binary and is called a "message" 514. The message contains time variant information and terminal specific information so that it may be uniquely identified; as well as details of the transaction itself. To perform the transaction the user authenticates himself at the transaction terminal using his smart card 515 and whatever means of electronic authentication has been adopted. This authentication also indicates the user's agreement to the transaction.

Having authenticated the user, the smart card receives the message, appends smart card specific data to allow the card and the user to be identified, and creates a seal using the process described below. This seal is appended to the message to form a "sealed message" 520. It will be understood that the whole sealed message may be authenticated by calculating check digits, such as a Message Authentication Code (MAC), or Digital Signature (DSG); but this would be an independent process, and is not described here as appropriate methods are well known in the art.

The sealed message 520 comprising message 514, smart card data, and seal is transmitted to the verifier.

The process for generating the seal is closely analogous to the process for generating the enciphered electronic signature stored by the verifier. Thus the seal is calculated as follows:

The message 514 is a binary string of indefinite length which would be padded if necessary to the nearest 8 byte boundary. The message is subjected to a hashing algorithm to reduce it to a 16 byte binary string. This hashing algorithm could, but need not, be the one used to reduce the ESR 512a to the HESR 513a, for example the MDC2 algorithm. The resultant 16 byte binary string will be referred to as the Message Hash or MASH 516.

The hashing algorithm may use a default hashing key or, optionally, an arbitrarily generated hashing or "transaction key". If an arbitrarily generated key is used, this key must be transmitted to the verifier with the transaction message. Secure transmission of transaction or of MAC verification keys is well known in the art and is not discussed further here.

The Build Key Process 506 then combines the MASH 516 with the Sealing Key 518. In this embodiment both are 16 bytes and the Build Key Process 506 could be a simple exclusive OR operation, resulting in a 16 byte key. This key is then used as a double length DEA key to triple encipher 517a the HESR supplied from the card 515. This HESR read off the card will be denoted +HESR+ in the description and figures, since it is not assumed to be the same as the HESR recorded at enrollment; for example it may have been corrupted. The enciphered +HESR+, together with the hashing key, if required, is the seal. If a default hashing key known to the verifier is used rather than an arbitrarily generated one, then the hashing key need not be included.

The use of the binary string MASH 516, generated from the transaction data, prevents the seal from having the same external appearance on any two occasions. Moreover, since the verifier or arbiter cannot decipher the HESR supplied from the card without reconstructing the MASH from the message 514 part of the sealed message 520, the seal cannot be deciphered if appended to any other message 514. This prevents the signature from being associated with any transaction other than the authorized transaction.

It is important to realize that the sealed message 520 transmitted to the verifier comprises the message 514, smart card specific data and the seal. The seal alone is not sufficient to regenerate the full transaction message 514, since it is based on the shorter MASH 516.

Validating

Figure 4:
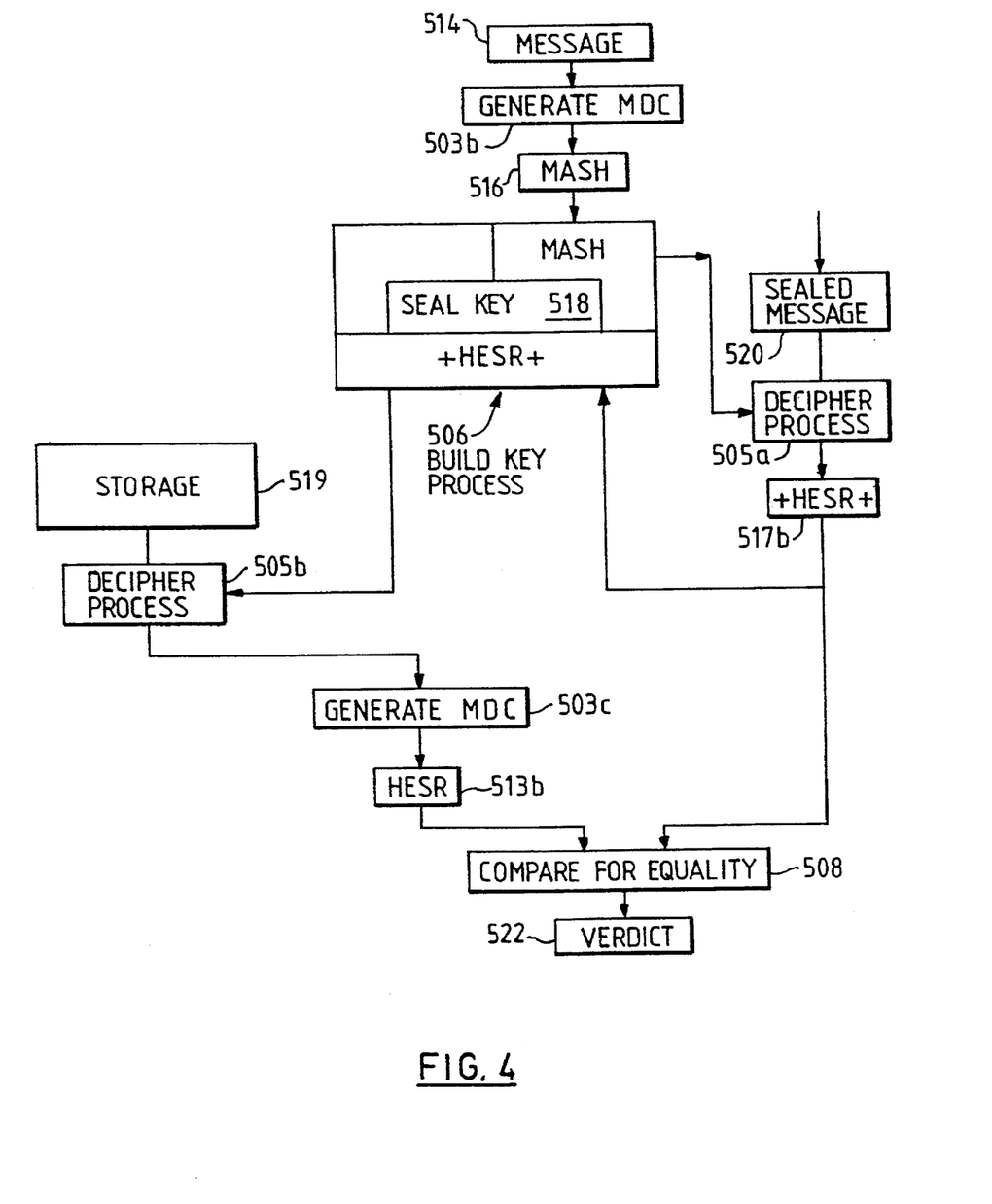
FIG. 4 is the portion of FIG. 1 which relates to the verification or validation process.

The verifier performs the following steps, shown in FIG. 4, to validate the transaction:

The binary string MASH 516 is calculated from the message portion 514 of the received sealed message 520 using the hashing algorithm which is also known to the verifier.

Using the MASH 516 and the Seal Verification Key 518 the verifier reconstructs via the Key Build Process 506 the double length key which was used to encipher the smart card stored +HESR+ 517a. The double length key is used to decipher 505a the +HESR+ 517b from the seal portion of the sealed message 520. In other words, the message portion 514 containing transaction details is needed in order to decipher 505a the +HESR+ 517b. If the seal becomes associated with a message 514 other than the authorized one used in the creation of the seal, it will be impossible to derive the +HESR+ 517b.

The smart card specific data, such as a smart card or user number, received as part of the sealed message 520 is used by the verifier as an index to retrieve the enciphered ESR corresponding to that user from storage 519.

The +HESR+ 517b is then used to decipher 505b the stored enciphered ESR 523. To do this, the +HESR+ 517b is combined with the Seal Verification Key 518 via the Build Key Process 506, and then used to reverse the triple encipher process 504a which was applied to the ESR 512a prior to storing 519 it. The clear value of the electronic signature ESR is thus obtained as an intermediate step at this point, but is not otherwise disclosed.

Next, the ESR is hashed 503c to generate a HESR value 513b of the result, since it is desired to compare the verifier's stored signature information with the smart card stored value, +HESR+, which is of the hashed form. In the preferred embodiment, the hashing process which is here applied to the signature stored by the verifier is identical to that used to generate the HESR stored on the smart card.

The verifier compares 508 this HESR 513b generated from the stored enciphered signature 523 with the recovered +HESR+ 517b from the message. A verdict 522 is given of the integrity of the received message. In the embodiment described, the comparison 508 is for equality, since identical hashing processes 503a, 503c were used. It will be understood that, if non-identical hashing processes were used, the comparison would not be for equality, but would need to be based on a functional relationship between the hashing processes.

Thus the signature 523 stored by the verifier, once deciphered and hashed, is verified against the quoted HESR value +HESR+ 517b used to decipher it. If the two signatures do not match, the deciphering process will not actually yield the true ESR value. The true HESR value obtainable only from the smart card is necessary to allow the verifier to decipher the signature.

A receiving application should also perform validation of the transaction contents not described here. If the message was authenticated with further check digits such as a MAC or DSG, these would also be verified.

Proving

Figure 5:
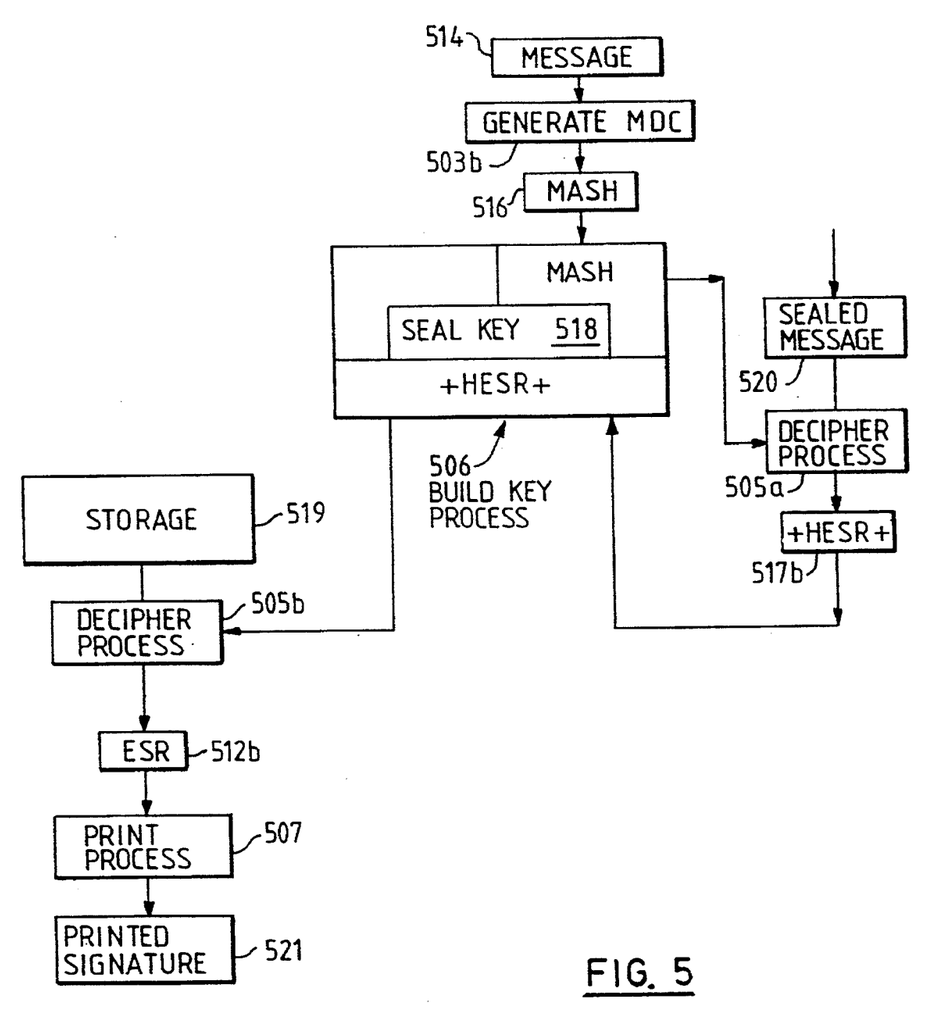
FIG. 5 is the portion of FIG. 1 which relates to the proving process.

The proving part of the process is shown in FIG. 5. During a dispute about the validity of a particular transaction, the verifier, or the arbiter (if appropriate), performs the same set of steps as described above, using a copy of the sealed message 520 stored at the time of the transaction. This time, however, the random number RNA is also stripped from the ESR 512b, and the electronic signature 521 is disclosed 507 and printed along with the transaction data in a suitable form.

The ability to reproduce the printed signature in association with the transaction establishes that the user's authority was granted and that the genuine smart card, holding the Sealing key 518 and HESR value 513a, was used to authorize the transaction.

It would be possible to use more than one seal key; one key shared between the smart card and the verifier could be used for enciphering 504b and deciphering 505a the seal, while another key could be used to encipher 504a and decipher 505b the stored signature information. Other alternatives to the specific encryption schemes and algorithms described, which are based on encryption methods known in the art, could be used. The bit lengths of variables could be changed without affecting the essence of the invention.

However, it is significant that the verifier alone is unable to reconstruct the unencrypted ESR, but requires information supplied from the smart card to decrypt his copy. Another significant feature is that the signature cannot be associated with a transaction other than the authorized transaction. This is achieved in the preferred embodiment by means of a particular seal or encryption scheme using algorithms known in the art; clearly other alternatives which preserved this feature could be used. Finally, such a scheme could if desired be applied to data other than signature data, such as, for example, a photograph; signature data is used as an example due to the legal status of the signature in many countries.

Implementation in the IBM Common Cryptographic Architecture/1

Although the above description is detailed enough to allow the invention to be implemented, it will now be described how the invention could be implemented using a particular architecture, IBM's Common Cryptographic Architecture/1, described in the manual "Cryptographic API Interface Reference", Order No. SC40-1675-01 available from International Business Machines Corporation. IBM's Transaction Security System is an example of a system using this architecture.

In the IBM Common Cryptographic Architecture/1, each encryption key has its usage defined by a Control Vector (CV). A CV is a structured 128 bit binary string whose value determines how the key may be used. Secure cryptographic hardware, such as can be found in the IBM Transaction Security System, interprets the control vector and enforces the usage constraints.

When encryption keys are transferred between cryptographic units, they are enciphered using higher level keys called key encrypting keys (KEKs). Before encipherment the KEK is modified by exclusive OR with the CV of the key being transferred. At the receiving unit the correct key will be deciphered only if the CV has not been corrupted in transit. Keys stored outside of secure hardware for local use are also enciphered by a KEK modified by the key's CV.

The KEKs are of three principle types (there are other types of no relevance here). A MASTER key is stored inside the secured hardware and is not shared with any other device. A key stored enciphered under a MASTER key is ready to be presented to the device which internally deciphers the key into clear form ready for use. To exchange keys between devices a shared KEK is required; this one KEK is known as an EXPORTER to the sending device and as an IMPORTER to the receiving device, although the key itself has the same value. The difference is in usage as defined by the different CVs at each device.

In this embodiment, such shared Key Encrypting Keys, defined to be IMPORTER/EXPORTER pairs, are generated and exchanged between the Arbiter and the Verifier, and between the Smart Card and the Verifier in an initial setup step. In both cases the EXPORTER form is held by the Verifier, and indicated in FIG. 6.

Figure 6:
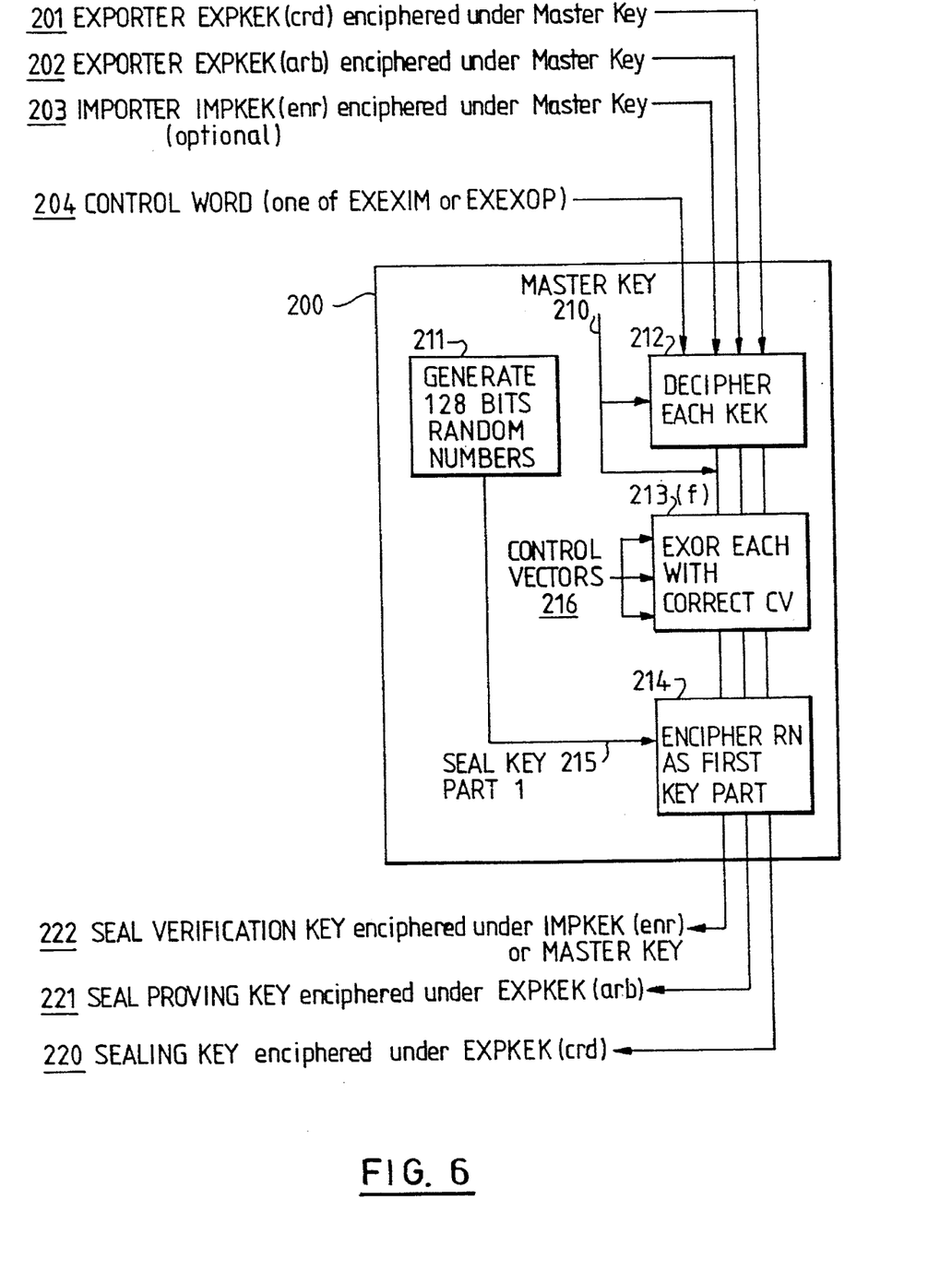
FIG. 6 shows an implementation of a Seal Key Generating Service using as an example a particular choice of architecture, the IBM Common Cryptographic Architecture/1 (CCA/1)

These key pairs are as follows:

KKEXPcrd 201 held by the verifier and its counterpart KKIMPcrd held by the card, and KKEXParb 202 held by the verifier and its counterpart KKIMParb held by the arbiter.

The purpose of this initial setup step is to provide shared Key Encrypting Keys to secure the subsequent exchange of a seal key.

Using a "Key Generate" service a device can create a key already enciphered under the appropriate KEK (MASTER ready for use; IMPORTER ready to receive back to itself; EXPORTER ready to send). The selection of KEK type for output from Key Generate is called the Key Form, and is designated EX for EXPORTER, IM for IMPORTER and OP (meaning Operational form) for MASTER.

The Key Generate Function in CCA/1 outputs one or two key forms. For this embodiment a new Key Generate Service 200 is defined, extending Key Generate to provide three outputs as shown in FIG. 6. Thus a single key, the Seal Key part 1 215 in FIG. 6, is generated 211 and output in three forms 220, 221, 222. This is achieved by enciphering 214 the Seal Key Part 1 215 under each of the KEKs 201, 202, 203 in turn, but in each case the KEK which is stored enciphered under a MASTER key 210 is first deciphered 212 using the MASTER key 210 and then exclusively ORed 213 with a different CV 216 based on the purpose of the key.

A Control Word 204 on the Service Call API (Application Programming Interface) allows the Key Form to be specified. In this embodiment either EXEXOP or EXEXIM is selected, where EXEXIM, for example, means the three forms of KEK 201, 202, 203 must be EX, EX and IM respectively. IMPORTER 203 is needed only if the EXEXIM control word is chosen; the creation and provision of a local IMPORTER key is not described here. If EXEXOP is selected, the MASTER key 210 is used and is already in the secure hardware boundary. The MASTER KEY 210 is used to decipher 212 each KEK internally so that it can be used; it will also be used to encipher 214 the Seal Key Part 1 to produce the Seal Verification Key 222 if EXEXOP is selected.

The "1" in Seal Key Part 1 215 is intended to indicate that this is the first component of a partial key, and so should not be used until after the key build process has completed.

The three forms of the Seal Key are

A Sealing Key 220 enciphered under the EXPORTER EXPKEK(crd) 201 shared with the card A Seal Proving Key 221 enciphered under the EXPORTER EPKEK(arb) 202 shared with the arbiter A Seal Verification Key 222 enciphered under the Master Key 210 of the verifier, or under a local IMPORTER key, IMPKEK(enr) in FIG. 6.

The Sealing Key 220 and the Seal Proving Key 221 are imported at the smart card and the arbiter respectively under the appropriate IMPORTER keys, IMPORTER IMPKEK(crd) and IMPORTER IMPKEK(arb). The Seal Verification Key 222 is for local use by the verifier.

The Control Vector definitions are extended such that the Seal Verification key 222 cannot be used in a function which discloses a clear signature; but the Seal Proving key 221 may be. In all three cases the control vector defines the key to be a partial key only; that is it is incomplete without a final key part being combined with it. The process for combining these key parts is undefined here but could be a simple exclusive OR operation as the external interfaces to the secure services do not allow a user control over the value of either part. This is the Key Build Process 111a and 111b of FIG. 7.

Figure 7A:
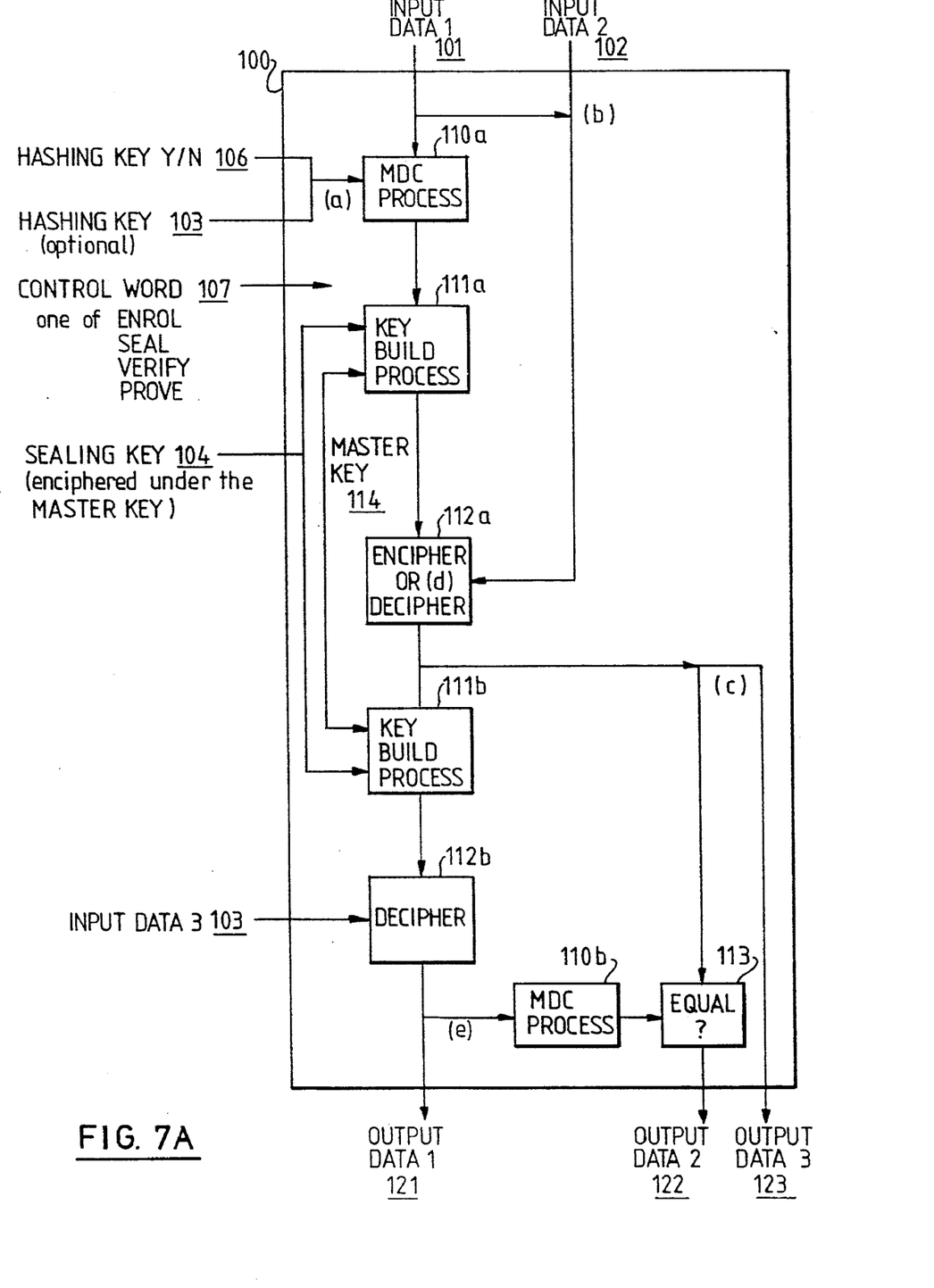
FIGS. 7A to E show an implementation of a Seal Processing Service using the IBM CCA/1.

FIG. 7A proposes an additional CCA/1 service, a Seal Processing Function 100, which can be used in different ways depending upon the settings of the input parameters Control Word 107. Hashing Key 106 determines whether a hashing key 103 is to be used. If not, MDC defines a default key to be used in the hashing or MDC algorithm. Only four of the possible combinations are relevant to this application.

Control Word 107 states whether the function is to Seal, as at enroller or on smart card, Verify or Prove.

Figure 7B:
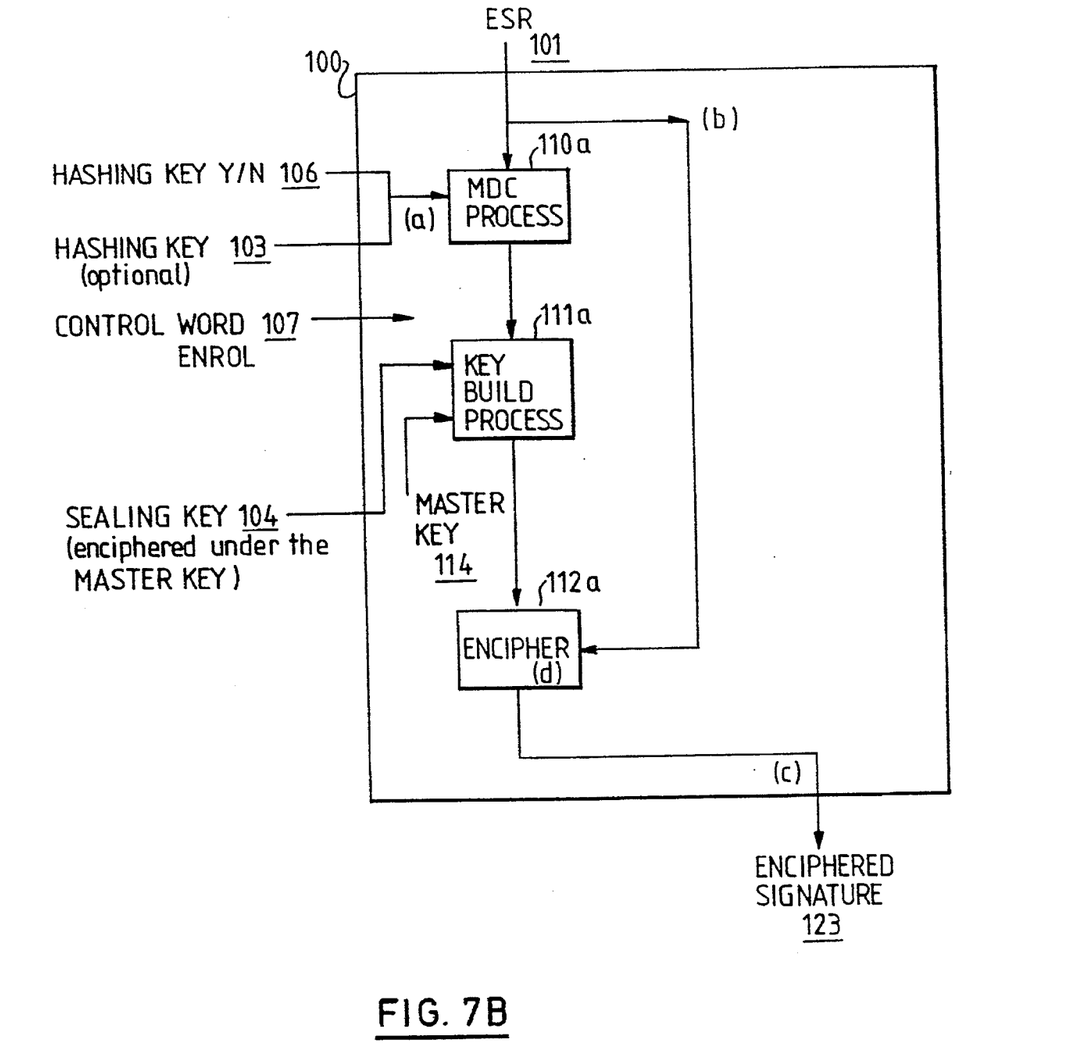

In FIG. 7B the process for encrypting the signature ESR for storage at the time of enrolment will now be described. The key used to encrypt the ESR for storage is the Seal Verification Key 222 combined via the Key Build Process 111a with the HESR. As mentioned the Key Build Process 111a could be a simple exclusive OR operation. To perform this process using the Seal Processing Function 100, the electronic signature record ESR is presented as Input Data 1 101. The MDC process 110 proceeds with a hashing key 103 or the default key as determined by the hashing key Y/N 106. The HESR is then combined via the Key Build Process 111 with the Seal Verification Key 222 which is presented as Seal Key 104. The key thus produced is used to encipher 112a Input Data 1 102, which is the ESR value. The selection of the Data input 1 101 to encipher 112a, and of encipherment rather than decipherment 112a is achieved by setting the Control Word 107 to ENROL. The enciphered ESR, represented as Output Data 3 123 is copied to the arbiter in this form. The completed key is not stored at any one location, but always rebuilt for usage from one of the three forms of the seal key and the HESR value.

Figure 7C:
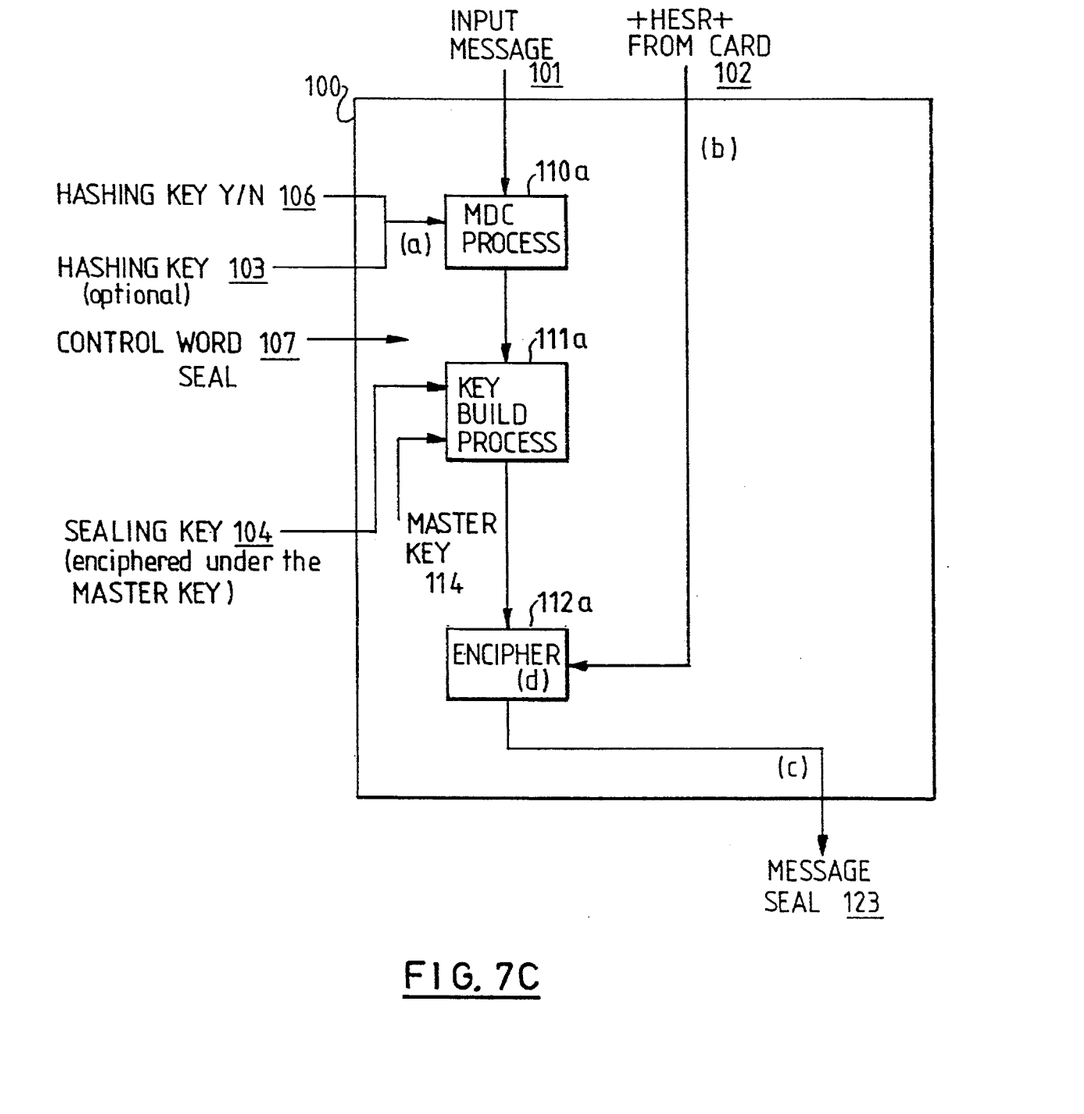

In FIG. 7C the key used to encrypt the smart card stored HESR for transmission with a particular transaction message is obtained by calculating a 16 byte MDC over the message, input as Input Data 1 101 optionally using the arbitrary key 103, as determined by the hashing key Y/N 106 setting, and combining this with the stored Sealing Key 220 which is presented as input 104 to the Key Build Process 111a. The smart card stored HESR is presented as Data Input 2 102 to the same function for encipherment 112a using this composite key, and the enciphered form is output as Data Output 3 123. To control this process, the Control Word 107 is set to SEAL, which determines the use of encipher as opposed to decipher internally 112 and the encipherment of Data Input 2 102.

Figure 7D:
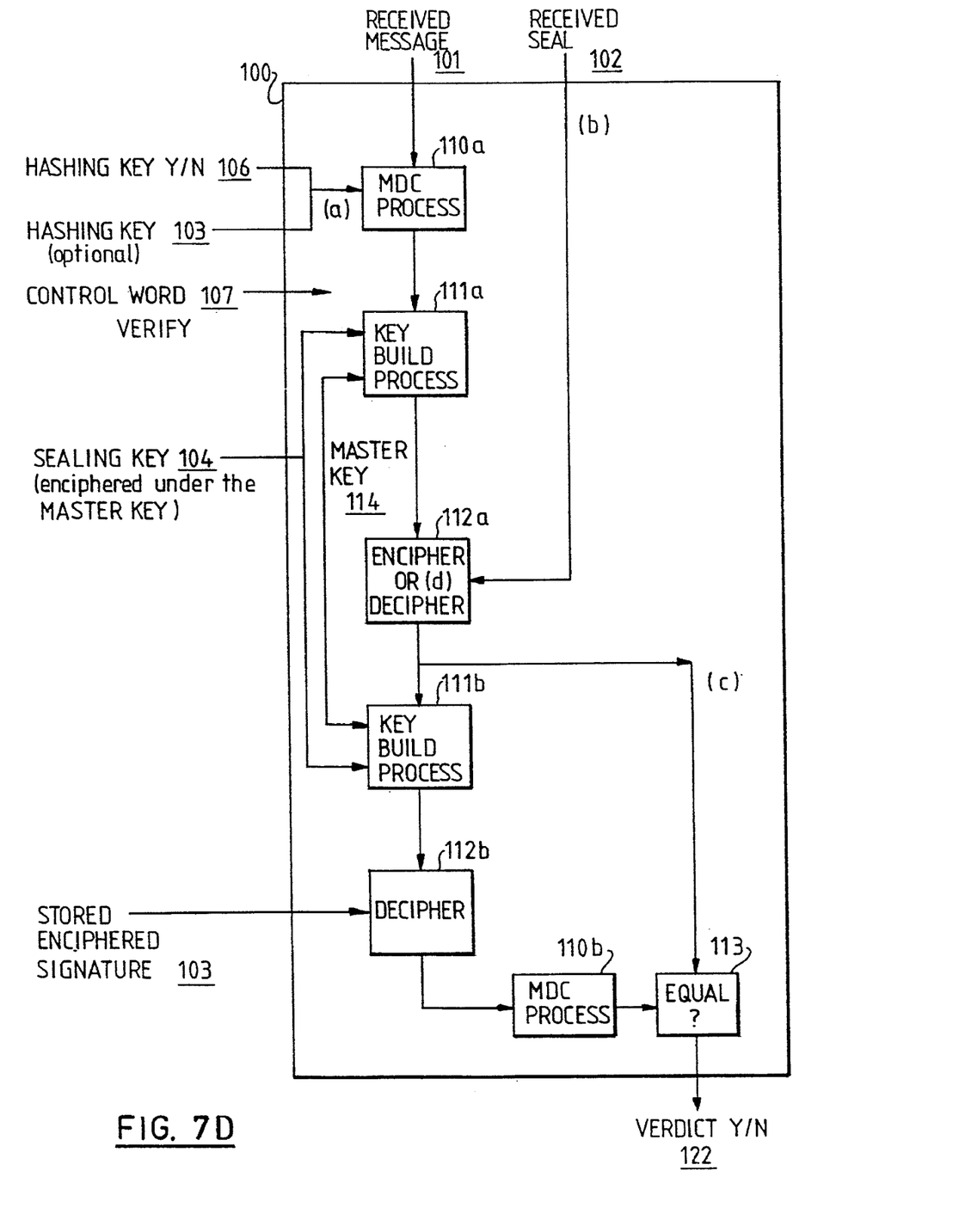
Figure 7E:
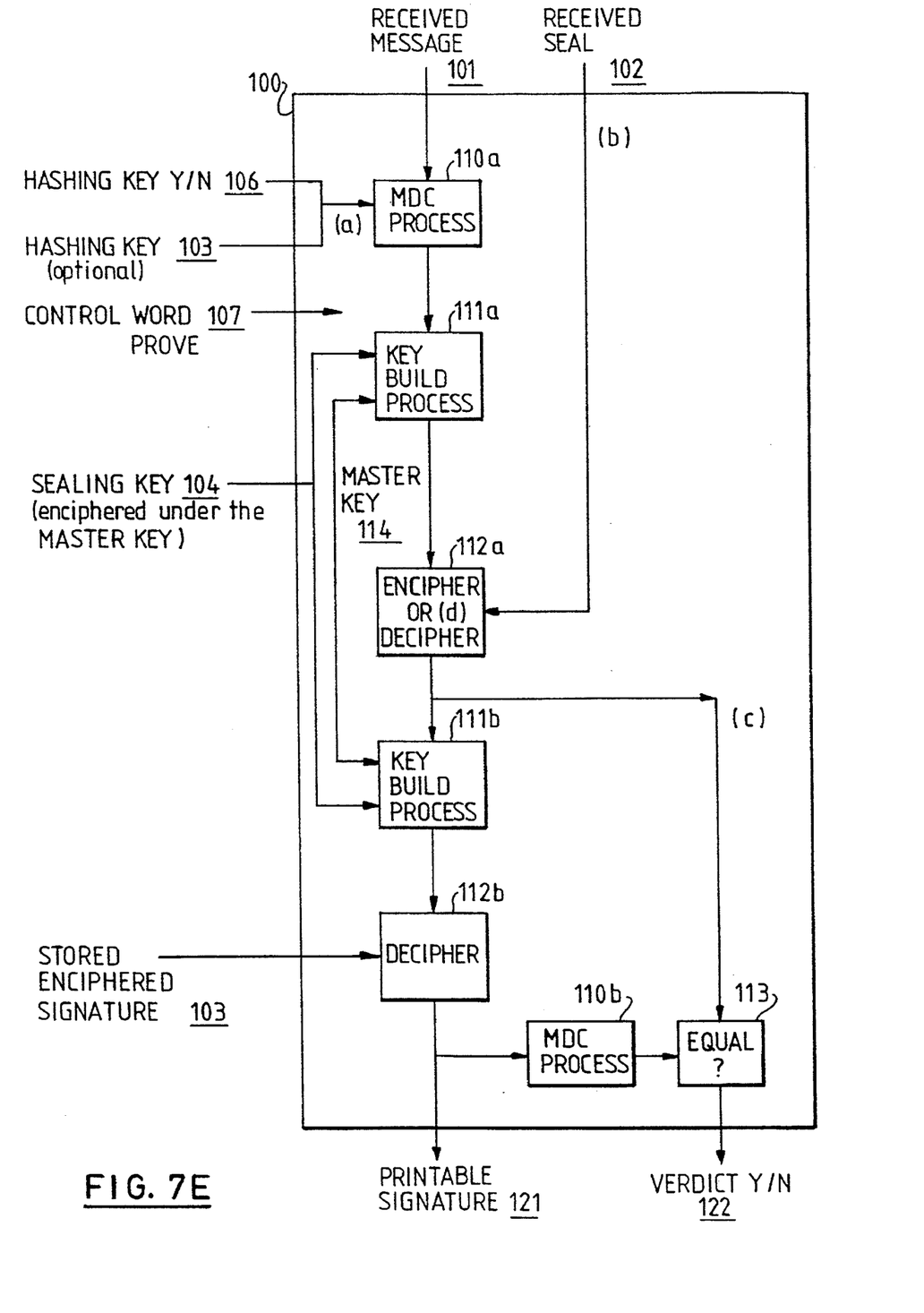

In FIG. 7D validation and proving proceed in essentially the same way as each other. In both of these cases Input Data 1 101 is the received message 514, Data input 2 102 is the seal from sealed message 520 and Data input 3 103 is the stored enciphered ESR 523. For validation, input 104 the Control Word 107 is set to VERIFY to yield a good/bad result as Output Data 2 122 from the comparison process 113. For proving the Control Word 107 is set to 'PROVE', as shown in FIG. 7E, then in addition the clear electronic signature is released as Output Data 1 121. The printable signature output data 1 121 will be recognizable only if the verdict of Output data 2 122 is 'good'.

Thus the one API level service should invoke one of four lower level and independently controlled services for ENROLLING at the Verifier (107=ENROL), SEALING on the smart card (107=SEAL), VERIFYING (107=VERIFY) and PROVING (107=PROVE). The enrolling and verifying processes are enforced by the same CV, the sealing and proving processes are each enforced by other distinct CVs.

This embodiment is in line with the principles of the IBM Common Cryptographic Architecture/1. In particular, the usage of all keys is governed by Control Vector settings enforced by the cryptographic hardware; and all externally manifest keys are enciphered either under a Key Encrypting Key 201, 202, 203 for transportation and local storage; or under a hardware stored Master key 114, 210 for local use.

In FIG. 1 to FIG. 5 the three manifestations of the Seal Key are not distinguished; all are indicated as Seal Key 518.

Having described the invention in connection with certain specific embodiments, it is to be understood that further modifications may now suggest themselves to those skilled in the art, and it is intended to cover such modifications as falling within the spirit and scope of the present invention and the appended claims.

What is claimed is:

1. A transaction processing system comprising:
a data processing system (14) and at least one transaction terminal (10, 11, 12) for use at a remote location by a user, the transaction terminal comprising:
  means to receive characteristic data (517a) from the user, which characteristic data is required to generate a characteristic image (521) associated with the user from user data (523) stored in the data processing system;
  logic for generating a transaction message (520) by combining data relating to a transaction (514) with the characteristic data (517a) in such a way that the transaction data (514) is required to recover the characteristic data (517a) from the transaction message (520); and
  means connectable to a data communications network for transmitting the transaction message (520) to the data processing system, and the data processing system comprising:
means to store the user data (523);
means to receive from the network and store the transaction message (520);
logic for recovering the characteristic data (517b) from the stored transaction message (520) using the transaction data (514); and
logic for reconstructing the characteristic image (512b, 521) from the user data (523) using the characteristic data (523, 517b) for use in establishing that the transaction was valid by associating the characteristic image with the transaction data.

2. A transaction processing system as claimed in claim 1 wherein the transaction terminal comprises means to establish that the user is authorized to effect the transaction.

3. A transaction processing system as claimed in claim 2 wherein the user data (523) comprises a random number combined with a digital representation (512a) of the characteristic image.

4. A transaction processing system as claimed in claim 3 wherein the characteristic data (513a, 517a) is generated from the user data using a hashing algorithm.

5. A transaction processing system as claimed in claim 4 wherein the transaction message (520) comprises a transaction portion containing the transaction data (514) and a seal portion, the seal portion comprising the characteristic data encrypted using a key (516) derived from the transaction data.

6. A transaction processing system as claimed in claim 5 wherein the key (516) is derived from the transaction data using a hashing algorithm.

7. A transaction processing system processing system comprises:

a first data processing facility (13) for use by a verifier, the first data processing facility comprising:
  means to receive from the network and store the transaction message (520) and
  means to effect the transaction using the transaction data;
a second data processing facility (14) for use by an arbiter, the second data processing facility comprising
  means to store the user data;
  logic for recovering the characteristic data (517b) from the stored transaction message (520) using the transaction data (514);
  and logic for reconstructing the characteristic image (512b, 521) from the characteristic data (523, 517b) using the user data for use in establishing that the transaction was valid by associating the characteristic image with the transaction data.

8. A transaction processing system as claimed in claim 7 wherein the characteristic data (513a) is generated from the user data using a hashing algorithm and the first data processing facility comprises
  means for storing encrypted user data (523) encrypted using the characteristic data;
  logic for recovering the characteristic data (517b) from the stored transaction message (520) using the transaction data (514);
  logic (505b) for decrypting the encrypted user data using the recovered characteristic data (517b);
  logic (503c) for generating the characteristic data (513b) from the decrypted user data;
  and means (508) to compare the characteristic data generated from the decrypted user data with the recovered characteristic data to establish the validity of the transaction.

9. A transaction processing system as claimed in claim 8 wherein the transaction terminal comprises a smart card (515) supplied by the user and a smart card reader, the smart card comprising means to store the characteristic data (517a) and logic for combining the characteristic data with the transaction data for use in generating the transaction message.

10. A transaction processing system as claimed in claim 9 wherein the smart card comprises means for storing a user-specific encryption key and logic for encrypting the characteristic data using the user-specific encryption key, the data processing system comprising means to store the user-specific key, and logic for using the user specific key to recover the characteristic data from the transaction message.

11. A data processing system adapted for use as the second data processing facility in a transaction processing system as claimed in claim 7 or claim 8.

12. Apparatus for enrolling users of a transaction processing system as claimed in claim 10, the apparatus comprising:
  means to generate and store a digital representation (511) of the characteristic image for each user;
  and logic for generating the user data and the characteristic data (513a) from the digital representation of the characteristic image.

13. Apparatus as claimed in claim 12, the apparatus comprising logic (504a) for encrypting the user data using the characteristic data.

14. A process for providing security in transaction processing systems comprising the steps of:
  creating a seal key and storing the key in a verifier storage and in a smart card containing user identification data;
  creating a user electronic signature and combining the signature with an input from a random number generator to form an electronic signature record (ESR);
  hashing the ESR to form a hashed ESR (HESR);
  enciphering the ESR using the HESR and the seal key to form an enciphered ESR for storage in the verifier storage;
  generating a transaction message using the smart card;
  hashing the transaction message to form a MASH;
  combining the HESR with the user identification information in the smart card to form a +HESR+;
  enciphering the message using the MASH, the seal key and the +HESR+ to form a sealed message; and
  validating the transaction message comprising the steps of:
    deciphering the sealed message to reform the +HESR+;
    deciphering the ESR from the verifier storage and hashing the ESR to form the HESR, and
    comparing the +HESR+ to the HESR to form a verdict.

15. The process of claim 14 further comprising the steps of:
  removing the random number from the ESR and printing the ESR thereby proving that the transaction was authorized using the smart card which contained the seal key and the HESR.

16. A process for providing security in a transaction processing system comprising the steps of:
  enrolling a user in the transaction processing system, the user being identified by an enciphered electronic signature record (ESR) stored in the system;
  conducting a transaction in the system, the user using a card containing the user identity, a seal and a hashed ESR (HESR), a card initiating an enciphered transaction message, an enciphered message description of the transaction data, and accompanying the transaction data with an enciphered hashed ESR (+HESR+); and
  verifying the transaction by comparing the deciphered stored ESR, after hashing, to the +HESR+ accompanying the transaction data.

17. The process of claim 16 further comprising the steps of:
  adding a random number to the ESR, and
  printing the ESR along with the transaction data.

18. The process of claim 17 further comprising the steps of:
  forming in the card characteristic data of the user; and
  cryptographically binding the characteristic data in the card to the transaction data whereby the transaction cannot be transferred or associated with another transaction.

19. A smart card adapted for providing security in a transaction system said smart comprising:
  a seal key stored in a memory;
  a smart card specific data stored in the memory;
  a hashed electronic signature record (HESR) stored in the memory; and
  a logic means for receiving a message, generating a seal and outputting the seal with the smart card specific data, wherein said seal is generated by hashing the message and combining the hashed message with the seal key to then encipher the HESR to form said seal.

20. The smart card of claim 19 wherein the message contains time variant information, transaction terminal information, and transaction information.

21. The smart card of claim 20 wherein the message is also output by the logic means with the seal and smart card specific data to form a sealed message.

* * * * *